(12) United States Patent
Bacher et al.

(10) Patent No.: US 9,418,234 B2
(45) Date of Patent: Aug. 16, 2016

(54) PROVIDING ISOLATED ENTROPY ELEMENTS

(71) Applicant: GLOBALFOUNDRIES Inc., Grand Cayman (KY)

(72) Inventors: Utz Bacher, Schoenbuch (DE); Einar Lueck, Stuttgart (DE); Stefan Raspl, Bondorf (DE); Thomas Spatzier, Sindelfingen (DE)

(73) Assignee: GLOBALFOUNDRIES INC., Grand Cayman (KY)

( * ) Notice: Subject to any disclaimer, the term of this patent is extended or adjusted under 35 U.S.C. 154(b) by 39 days.

(21) Appl. No.: 14/505,734

(22) Filed: Oct. 3, 2014

(65) Prior Publication Data

US 2015/0106952 A1    Apr. 16, 2015

(30) Foreign Application Priority Data

Oct. 10, 2013    (GB) .................................. 1317907.2

(51) Int. Cl.
| | |
|---|---|
| *H04L 29/06* | (2006.01) |
| *G06F 21/60* | (2013.01) |
| *G06F 9/455* | (2006.01) |
| *G06F 21/73* | (2013.01) |

(52) U.S. Cl.
CPC ............ *G06F 21/60* (2013.01); *G06F 9/45558* (2013.01); *G06F 21/73* (2013.01); *H04L 63/06* (2013.01); *G06F 2009/45587* (2013.01)

(58) Field of Classification Search
CPC ... G06F 21/60; G06F 9/45545; G06F 9/4591; H04L 67/10
USPC .................................. 726/26; 718/1; 709/217
See application file for complete search history.

(56) References Cited

U.S. PATENT DOCUMENTS

| | | | | |
|---|---|---|---|---|
| 7,930,332 | B2* | 4/2011 | Acar ......................... | G06F 7/58 708/250 |
| 8,189,778 | B2* | 5/2012 | Zhang .................... | H04L 9/0662 380/44 |
| 8,250,127 | B2 | 8/2012 | Kelly | |
| 2008/0256151 | A1* | 10/2008 | Acar ......................... | G06F 7/58 708/250 |
| 2011/0047545 | A1* | 2/2011 | Ellison .................... | G06F 7/588 718/1 |

(Continued)

FOREIGN PATENT DOCUMENTS

WO    2014011443    1/2014

OTHER PUBLICATIONS

Kerrigan et al., A Study of Entropy Sources in Cloud Computers: Random Number Generation on Cloud Hosts, Lecture Notes in Computer Science vol. 7531, 2012, p. 286-298.

*Primary Examiner* — Izunna Okeke
*Assistant Examiner* — Hee Song
(74) *Attorney, Agent, or Firm* — Michael LeStrange; Andrew M. Calderon; Roberts Mlotkowski Safran Cole & Calderon P.C.

(57) ABSTRACT

Embodiments of the invention relate to providing isolated entropy elements for a virtual machine to increase entropy in a computing environment. At least one virtual machine is deployed on a hypervisor. The hypervisor generates entropy elements based on triggers related to a virtual machine. Identifiers are assigned to the entropy elements based on the triggers and the virtual machine. Use of the entropy elements is restricted for the virtual machine based on the assigned identifiers. The increase in entropy through providing isolated entropy elements for a virtual machine deployed on a hypervisor reduces the success of external attacks on data residing within the computing environment.

14 Claims, 4 Drawing Sheets

(56) References Cited

U.S. PATENT DOCUMENTS

| | | | | |
|---|---|---|---|---|
| 2014/0237151 A1* | 8/2014 | Jacobs | ............... | G06F 9/5005 710/268 |
| 2014/0244785 A1* | 8/2014 | Potlapally | ............... | H04L 67/10 709/217 |
| 2015/0058841 A1* | 2/2015 | Krempa | ............... | G06F 9/45558 718/1 |

* cited by examiner

PROVIDING ISOLATED ENTROPY ELEMENTS

CROSS-REFERENCE TO RELATED APPLICATION

This application claims priority under 35 U.S.C. §119 from European Patent Application No. 1317907.2 filed Oct. 10, 2013, the entire contents of which are incorporated herein by reference.

BACKGROUND

The invention relates to providing isolated entropy elements for a virtual machine. More specifically, the invention relates to a method, entropy element generator, computing system, and computer program product for providing isolated entropy elements for the virtual machine.

In virtualized computing environments, there are only a few sources of entropy, i.e., random numbers, available because there are typically no real timer interrupts and no real devices, and there are isolated networks, which do not show any traffic in virtual machines. Only a few other sources of entropy may be present, if any at all. This may lead to software installation problems, e.g., when a security key has to be created during installation of a virtual machine, as the system may lack sufficient entropy, or the entropy between multiple virtualized operating system images might be too similar to suffice security standards. Sometimes, even installations of operating systems in virtual machines do not succeed since not enough entropy is available, and a necessary host security key cannot be generated. A typical example is a planned Linux operating system installation which requires, during installation, generating random security keys for usage with an ssh daemon, secure shell daemon, for the SSL communication protocol, where SSL is a secure socket layer. Such a protocol may be used for a log-in into a newly installed Linux operating system. However, the installation process may be stopped because the security key based on one or more random numbers cannot be generated.

Various approaches are known in the art to mitigate this problem, which may be a consequence of virtualization efficiency. One approach includes adding sources of pseudo entropy in the virtual machine, such as media access control numbers or available serial numbers. However, typically, this approach may not generate a sufficient amount of entropy, and may provide entropy with limited quality. Moreover, this approach targets embedded devices and may only partially apply to virtualized environments.

Another approach includes forwarding entropy sources from a host computer to a virtual server. This approach uses the entropy generated on the host computer. However, in doing so, this approach introduces additional vulnerabilities. Specifically, in a multi-tenancy environment, e.g., a cloud computing environment provided by an Infrastructure-as-a-Service (IaaS) provider, an attacker may influence the quality of entropy available in the hypervisor, for example, through regularly sending small message packets to influence the interrupts towards known time patterns, or similar attacks. A key generation process that relies on a timing of input/output interrupts may not be 100% predictable. That said, a brute force security attack to a virtual machine using security keys based on such entropy elements may lower the required effort to break into the attacked virtual machine.

A further approach includes using hardware random number generators. However, this approach may be expensive and may depend on availability of respective hardware.

The problem of entropy has been addressed in the art. For instance, U.S. Patent Application Publication No. 2001/0047545 A1 addresses entropy pools for virtual machines. In a host operating system of a computing device, entropy data is collected based at least in part on each of one or more hardware components of the computing device. An entropy pool is updated based at least in part on the collected entropy data, and data from the entropy pool is provided to a guest operating system running as a virtual machine of the computing device. However, this solution leaves vulnerabilities because I/O attacks to a series of already installed virtual machines may lead to a random number generation for an installation for a further virtual machine of another user.

SUMMARY

This invention includes a method, entropy element generator, and computer program product for providing isolated entropy elements for a virtual machine to improve data security.

A method, entropy element generator, and computer program product are provided for improving data security, and, more specifically, for improving entropy within a computing environment to protect against external attacks on data. At least one virtual machine is deployed on a hypervisor. Based on triggers, the hypervisor generates at least one entropy element. An identifier is assigned to each entropy element. One identifier is assigned for entropy elements of the same virtual machine and same trigger. Use of the entropy elements is restricted for entropy elements having the same identifier for the selected virtual machine.

These and other features and advantages of this invention will become apparent from the following detailed description of the presently preferred embodiments of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

Figure 1:
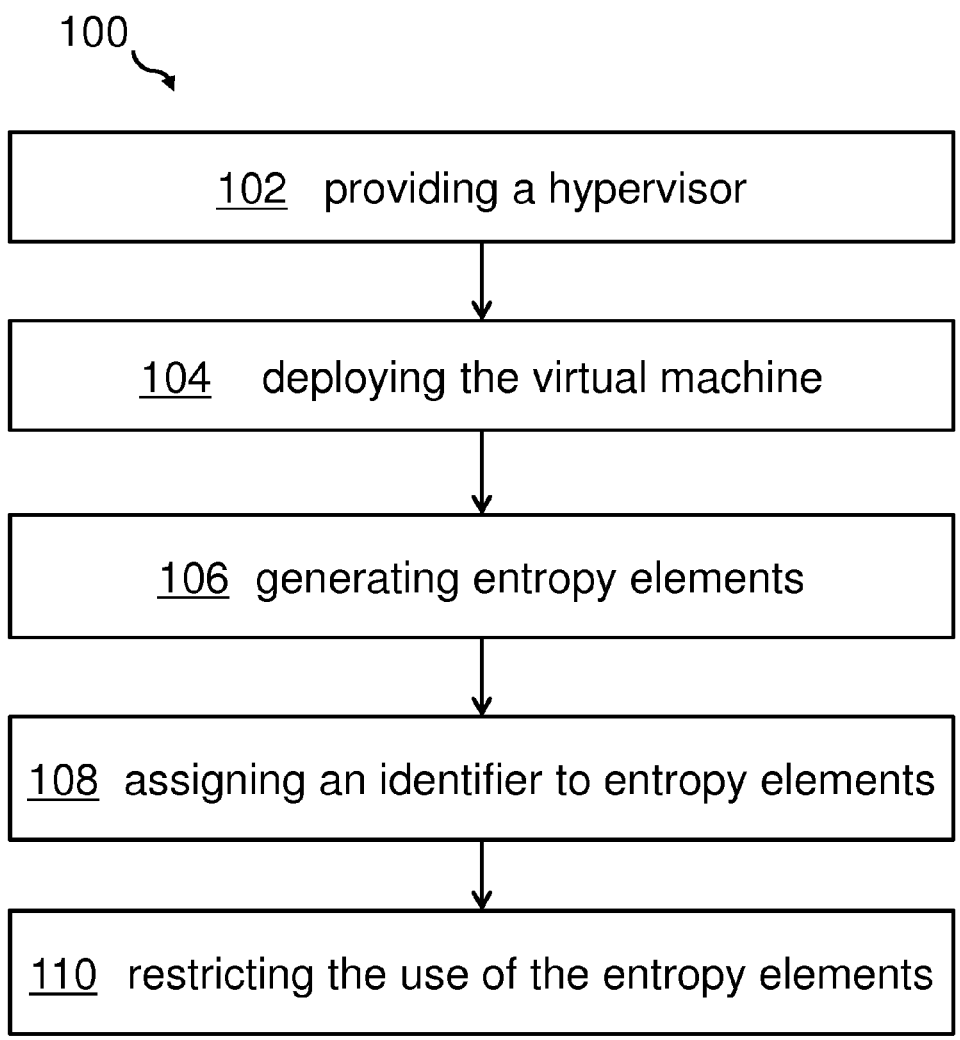
FIG. 1 depicts a flow chart illustrating a process for providing isolated entropy elements.

It will be readily understood that the components of the present invention, as generally described and illustrated in the Figures herein, may be arranged and designed in a wide variety of different configurations. Thus, the following more detailed description of the embodiments of the apparatus, system, and/or method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of triggers to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention. It is to be understood that other embodiments may be utilized because structural changes may be made without departing from the scope of the present invention.

In the following description of the embodiments, reference is made to the accompanying drawings that form a part hereof, and which shows by way of illustration the specific embodiment in which the invention may be practiced. The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A method for providing isolated entropy elements for a virtual machine is provided. In one embodiment, the method comprises providing a hypervisor and deploying at least one virtual machine on the hypervisor. Additionally, the method may comprise generating entropy elements by the hypervisor based on triggers, as well as assigning an identifier to each entropy element, wherein the entropy elements based on the triggers for a selected virtual machine may be assigned the same identifier. Furthermore, the method may comprise restricting usage of the entropy elements having the same identifier for the selected virtual machine.

The term "entropy" denotes and is used herein as a synonym for randomness. The higher or the better the entropy of data elements, the better the randomness of individual data elements. The term "entropy element" denotes a pseudo-random number. As is known in the art, random numbers are required in computer systems for generating security keys for encryption purposes. FIG. 1 shows a flow chart (100) of a method for providing isolated entropy elements for a virtual machine. The method (100) comprises providing a hypervisor (102), in particular, on a host computer system. A "hypervisor" denotes a piece of computer software, or firmware, supporting a runtime environment for virtual machines. In one embodiment, a hypervisor may be a virtual machine monitor. The hypervisor may run on a physical host computer and the virtual machines may be denoted as guest machines, which may be implemented in software. Thus, the hypervisor may represent the guest operating systems with a virtual computing platform and may manage the execution of the guest operating systems including all information exchange to the physical world of the physical host computer. In one embodiment, multiple instances of a variety of operating systems may share the virtualized host for physical resources. In another embodiment, mainframe environments may allow nested virtualization, i.e., the hypervisor my run in logical partition (LPAR) of the mainframe environment. A separation of the resources of the mainframe computer may be realized using a processor resource/system manager which may also be seen as a hypervisor.

The method (100) further comprises deploying at least one virtual machine (104) on the hypervisor (102). The hypervisor generates entropy elements (106) based on triggers. The term "trigger" denotes and is used herein as a synonym for an event, externally originating action, such as an effect of a key stroke on a keyboard, incoming network traffic, a click event from a pointing device, or the like. A trigger may be based on hardware or software source, or a combination thereof. In one embodiment, a trigger is based on input/output interrupts, wherein a related communication package content may indicate the relationship to a certain virtual machine.

Moreover, the method comprises generating entropy elements (106) and assigning an identifier (108) to each generated entropy element (106). An identifier may be instrumental for restricting the entropy elements to just one selected virtual machine. Different entropy elements, having assigned different identifiers, may be used for different virtual machines. Those entropy elements which may be based on triggers for a selected virtual machine may have assigned the same identifier. Thus, groups of entropy elements may be built having the same identifier. Such groups of entropy elements may build entropy element pools. The term "entropy element pool" denotes a plurality of entropy elements, i.e., random numbers. An entropy element pool may be empty, i.e., may not comprise any random number. An entropy element pool may comprise entropy elements with a common characteristic, e.g., the same assigned identifier.

The term "isolated entropy elements" denotes entropy elements dedicated to a specific virtual machine. The entropy elements for one specific virtual machine may be isolated from other entropy elements for another virtual machine. A feature to differentiate entropy elements dedicated to different entropy element pools may be to assign identifiers to entropy elements. Moreover, the identifier may be instrumental for restricting the entropy elements to just one, i.e., the selected virtual machine. Different entropy elements, having assigned different identifiers, may be used for different virtual machines.

The method further comprises restricting the use of the entropy elements (106) having the same identifier for the selected virtual machine (110). With this in mind, isolated entropy elements may be generated instead of using entropy elements based on triggers from other virtual machines. The isolation may be understood as managing the group of entropy elements only for one virtual machine. In one embodiment, the entropy elements may be transferred only to the related virtual machine.

Figure 2:
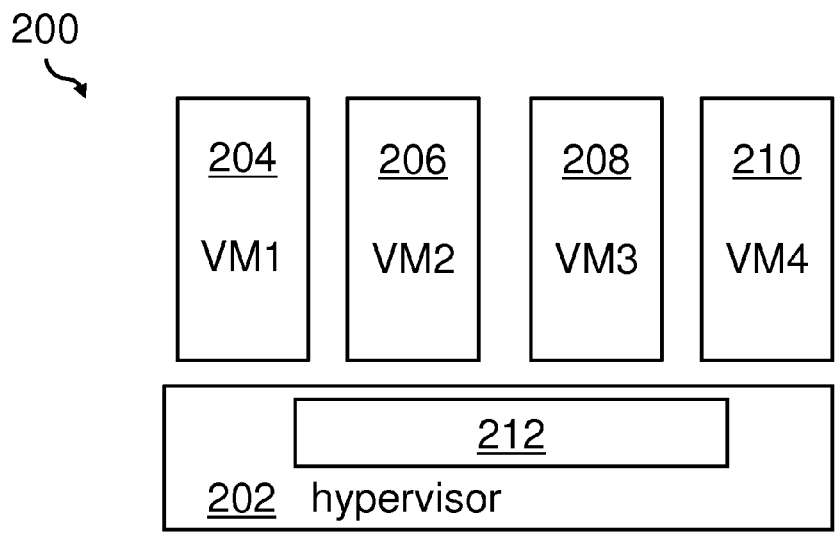
FIG. 2 depicts a block diagram of a hypervisor with virtual machines and an entropy element pool.

Referring now to FIG. 2, an exemplary hypervisor with virtual machines and an entropy element pool is shown. More specifically, FIG. 2 is a block diagram (200) of a hypervisor (202) with virtual machines $VM_1$ (204), $VM_2$ (206), $VM_3$ (208), $VM_4$ (210) and an entropy element pool (212) according to the state-of-the-art technology. The entropy element pool (212) may comprise entropy elements which may be available to all four virtual machines $VM_1$ (204), $VM_2$ (206), $VM_3$ (208), and $VM_4$ (210).

In a typical attacker scenario in a virtualized cloud computing environment of a cloud provider, e.g., an Infrastructure-as-a-Service, the virtual machines $VM_1$ (204), $VM_2$ (206), VM₃ (208) may be operated by an attacker. Entropy elements or random numbers may be generated using input and/or output events or interrupts. These interrupts may reach the hypervisor (202). Here, a joint pool (212) of entropy elements may be made available. The attacker may regularly generate and at predictable times send messages to the virtual machines VM₁ (204), VM₂ (206), VM₃ (208), and thus influence the available pool of entropy elements in the entropy element pool (212). Although dedicated entropy elements may not be exactly predictable by the attacker, the number of available options for entropy elements may be limited in the joint entropy element pool (212). This may be due to a time stamping mechanism used for generating entropy elements for the entropy element pool (212). Therefore, security risks may grow with more virtual non-trusted servers, e.g., operated by a potential attacker, on a hypervisor.

Another tenant of an IaaS environment, attempting to install the virtual machine VM (210), may depend on entropy elements from the entropy element pool (212). The entropy elements may be required in the virtual machine VM₄ (210) for generating security keys for a secure log-in to the newly installed virtual machine VM₄ (210). However, the randomness of the entropy elements in the entropy element pool (212) may be low due to the above-mentioned input/output signals which may be handled by the hypervisor (202) for the virtual machines VM₁ (204), VM₂ (206), VM₃ (208). Consequently, the attacker may only have to try a limited number of entropy elements for a security key based log-in into the virtual machine VM₄ (210) because the security key may—due to a limited randomness—now only guarantee a limited security.

Figure 3:
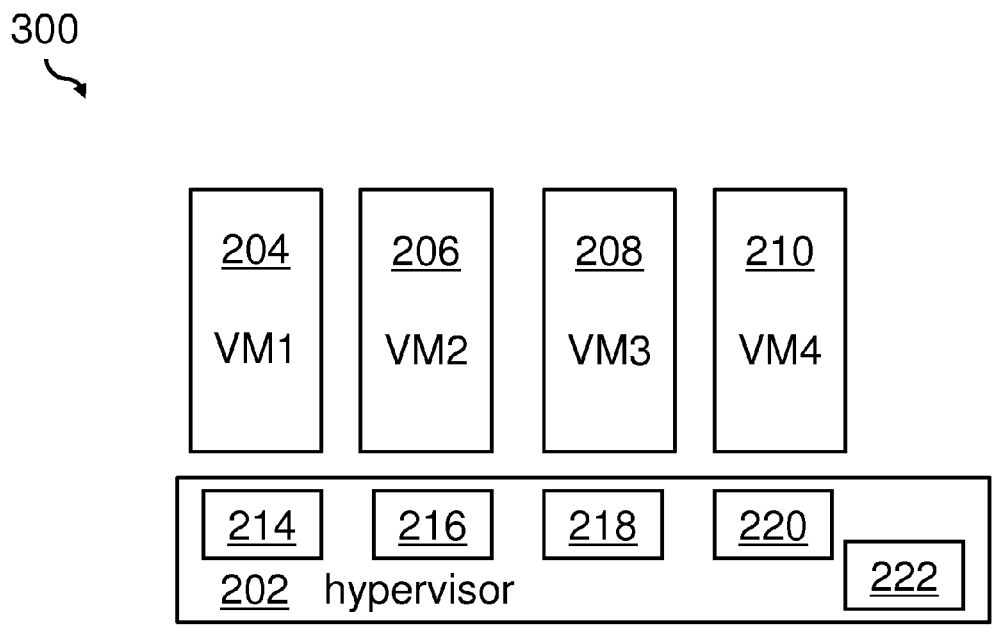
FIG. 3 depicts a block diagram of a hypervisor with virtual machines and dedicated, isolated entropy pools for each virtual machine.

With reference now to FIG. 3, a hypervisor with virtual machines and dedicated isolated entropy pools for each virtual machine are shown. Specifically, FIG. 3 shows a block diagram (300) of the hypervisor (202) with virtual machines VM₁ (204), VM₂ (206), VM₃ (208), and VM₄ (210), and dedicated isolated entropy pools (214), (216), (218), and (220) for each virtual machine.

Interrupts, as a classical source for entropy elements, may be time-stamped. However, time-stamped entropy elements may not immediately be given into the entropy pool by an interrupt handler. Instead, the target or source of the interrupt may be determined at first. For instance, a keyboard entry of a virtual server VM₁ (204), VM₂ (206), VM₃ (208), or VM₄ (210) took place, or a communication packet was successfully sent or received by a virtual server VM₁ (204), VM₂ (206), VM₃ (208), or VM₄ (210). After determining the associated or selected virtual server, the time-stamped data may be used for the generation of the entropy element for that specific, selected, virtual machine only. Entropy elements may be passed up to the virtual machine immediately once the virtual machine is known. However, in a preferred embodiment the entropy elements are pooled and made accessible to virtual machines through an interface, which may be a virtualized or para-virtualized interface. In a preferred embodiment, this may be implemented by using the "virtio-rng" function known by a skilled person. It may, e.g., be controlled through a Linux device driver in the host computer. Therefore, a virtual machine's devices, e.g., the virtual network devices carrying traffic from and to that guest, may be associated to a virtual device, from which "virtio-rng" may read entropy elements.

In summary, there may be a separate or isolated entropy element pool (214) for the virtual machine VM₁ (204), a separate or isolated entropy element pool (216) for the virtual machine VM₁ (206), and so on (see reference numerals (218) and (220)). In addition, there may also be an entropy element pool (222) which may be dedicated and assigned to the hypervisor only. Consequently, other virtual machines cannot influence any entropy element generation for the selected virtual machine. Therefore, the virtualization efficiency may be extended to generation and management of entropy elements. Entropy elements for any of the isolated entropy element pools (214), (216), (218), (220) as well as (222) may be associated with, e.g., a virtual NIC (network interface controller, not shown) or control signals of a virtual disk (not shown) from which the "virtio-rng" may read entropy elements.

Figure 4:
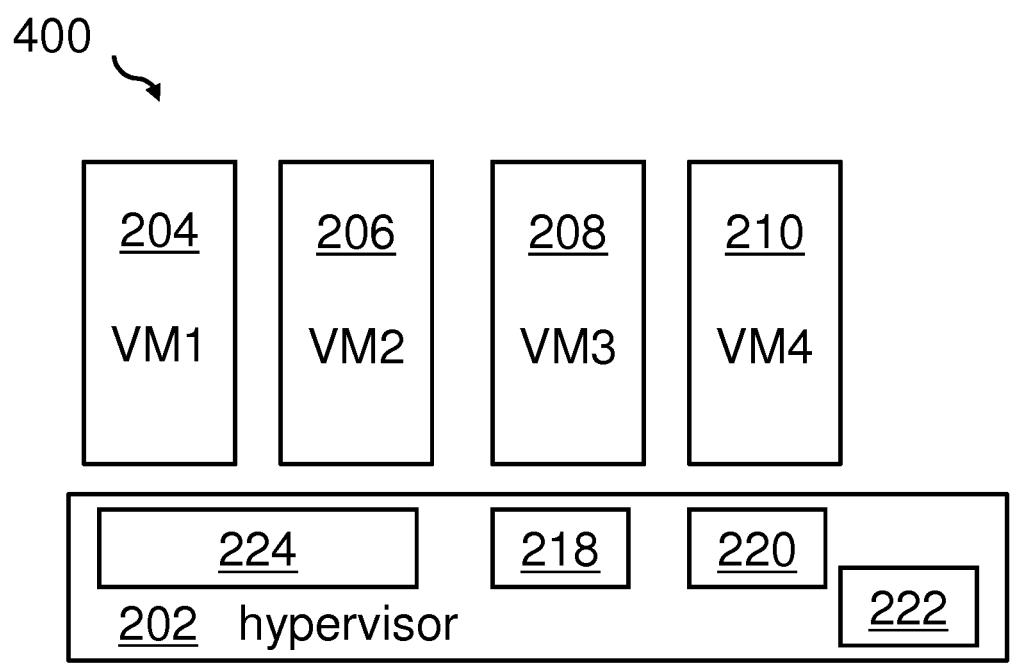
FIG. 4 depicts a block diagram of a selectively joined entropy element pool.

FIG. 4 shows a block diagram (400) of a selectively joined entropy element pool (224). As explained above, two entropy element pools for example, entropy element pools (214) in (216) may be merged or joined into a new entropy element pool (224). The available entropy elements in entropy element pool (224) may be dedicated to the virtual machine VM₁ (204) and/or virtual machine VM₂ (206), only. The virtual machines VM₁ (204) and VM₂ (206) may be seen as trusted virtual machines. Here, trusted virtual machines may denote those virtual machines with a comparatively high randomness of entropy elements. They may belong to the same tenants or operator. Thus, security keys generated by these virtual machines may be safe.

An entropy element generator is also provided for providing isolated entropy elements for a virtual machine. The entropy element generator may comprise a deploying unit adapted for deploying at least one virtual machine on a hypervisor. Furthermore, the entropy element generator may comprise a generator module adapted for generating entropy elements by the hypervisor based on triggers. An assigning unit may be adapted for assigning an identifier to each entropy elements. Entropy elements based on triggers for a selected virtual machine may have assigned the same identifier. It may comprise optionally a hypervisor unit adapted for providing the hypervisor, in particular on a host computer. Additionally, a restricting unit may further be adapted for restricting use of the entropy elements having the same identifier for the selected virtual machine.

Figure 5:
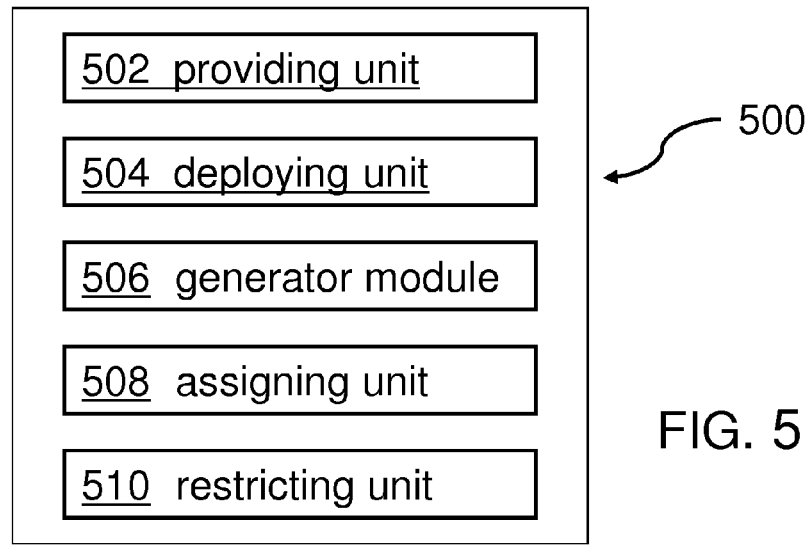
FIG. 5 depicts a block diagram of an entropy element generator.

FIG. 5 shows a block diagram (500) of an entropy element generator, for providing isolated entropy elements for a virtual machine. In one embodiment, the entropy element generator (500) comprises a hypervisor providing unit (502) adapted for providing the hypervisor. The entropy element generator (500) further comprises a deploying unit (504) for deploying at least one virtual machine on a hypervisor. The entropy element generator (500) further comprises a generator module (506) for generating entropy elements by the hypervisor based on triggers. Additionally, the entropy element generator (500) comprises an assigning unit (508) for assigning an identifier to each entropy element, wherein the entropy elements based on triggers for a selected virtual machine may have assigned the same identifier. Thus, entropy elements based on input/output triggers are assigned to the same pool of entropy elements. Furthermore, the entropy element generator (500) comprises a restricting unit (510) for restricting use of the entropy elements having the same identifier for the selected virtual machine.

Figure 6:
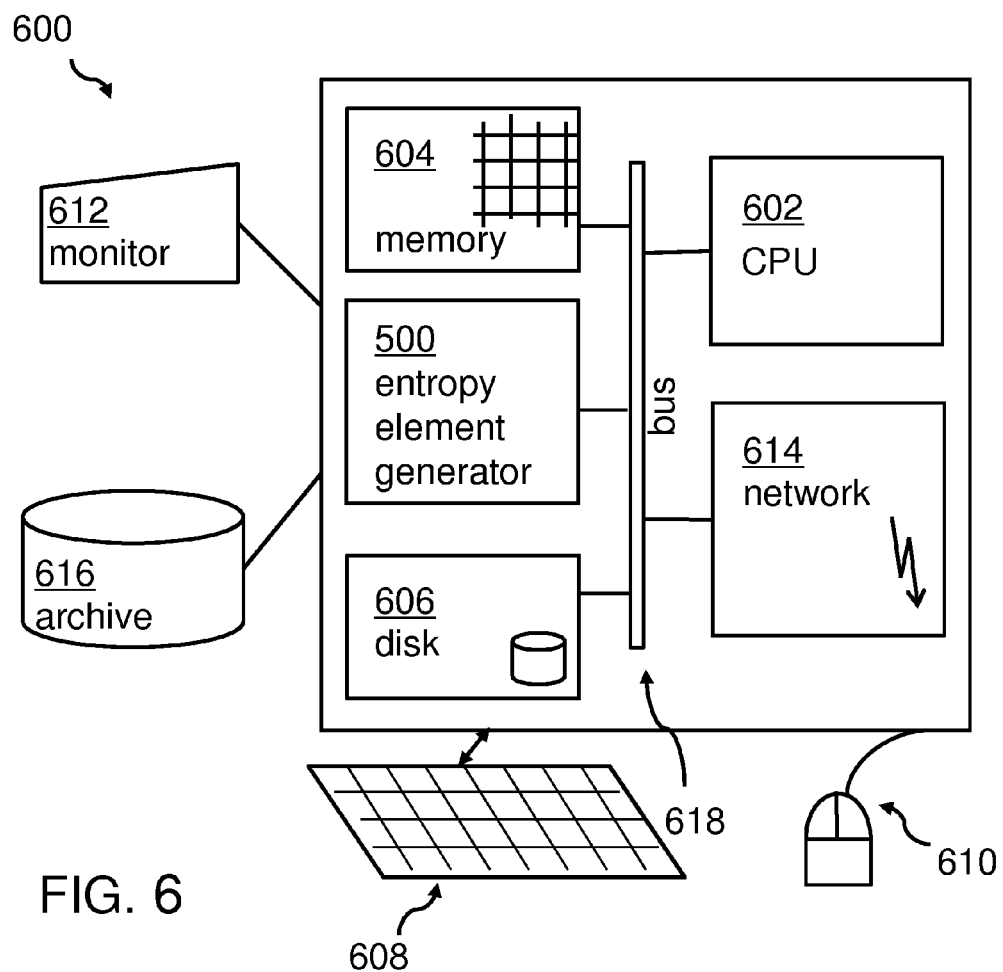
FIG. 6 depicts a block diagram of a computer system comprising an entropy element generator.

A computer system is also provided comprising a central processing unit and a memory, as well as the entropy element generator. Embodiments of the invention may be implemented together with virtually any type of computer, regardless of the platform being suitable for storing and/or executing program code. For example, as shown in FIG. 6, which shows a computer system comprising an entropy element generator, a computing system (600) may include one or more processor(s) (602) with one or more cores per processor, associated memory elements (604), an internal storage device (606) (e.g., a hard disk, an optical drive such as a compact disk drive or digital video disk (DVD) drive, a flash memory stick, a solid-state disk, etc.), and numerous other elements and functionalities, typical of today's computers (not shown). The memory elements (604) may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage (616) for an execution. Elements inside the computer (600) may be linked together by means of a bus system (618) with corresponding adapters. Additionally, the entropy element generator (500) described in FIG. 5 may be attached to the bus system (518).

The computing system (600) may also include input means, such as a keyboard (608), a pointing device such as a mouse (610), or a microphone (not shown). Alternatively, the computing system may be equipped with a touch sensitive screen as main input device. Furthermore, the computer (600), may include output means, such as a monitor or screen (612) e.g., a liquid crystal display (LCD), a plasma display, a light emitting diode display (LED), or cathode ray tube (CRT) monitor. The computer system 600 may be connected to a network e.g., a local area network (LAN), a wide area network (WAN), such as the Internet or any other similar type of network, including wireless networks via a network interface connection (614). This may allow a coupling to other computer systems or a storage network or a tape drive. Those, skilled in the art will appreciate that many different types of computer systems exist, and the aforementioned input and output means may take other forms. Generally speaking, the computer system (600) may include at least the minimal processing, input and/or output means, necessary to practice embodiments of the invention.

In one embodiment, isolated entropy elements for a virtual machine generated using a hypervisor supports dedicating the generated entropy elements to a specific or selected virtual machine. Dedicating entropy elements may limit the influence of an entropy element generation for a virtual machine by other virtual machines running on the same hypervisor. With this in mind, input/output traffic for a generation of entropy elements for one or more dedicated virtual machines may not influence entropy elements for a virtual machine not belonging to the one or more dedicated virtual machines. Thus, entropy elements generation and dedication for different virtual machines on the same hypervisor may be separated and isolated from each other. Therefore, a security key generation for a virtual machine based on entropy elements originating from the hypervisor may have a higher randomness in comparison to a situation in which a joint pool of entropy elements is available for all virtual machines.

In one embodiment, generating isolated entropy elements for a virtual machine enables a higher degree of security for newly installed virtual machines. An attacker may not be able to predict or limit the scope of newly generated entropy elements by detecting a series of virtual machines on a hypervisor. In one embodiment, the entropy elements may be used to generate security keys for a secured communication protocol to a virtual machine.

In another embodiment, a trigger may be a time-stamp to an input signal of the selected virtual machine, a time-stamp of an output signal of the selected virtual machine, or other interrupts dedicated to the selected virtual machine, such as a hardware or software timer. It may be noted that "dedicated", as used herein, may mean, for instance, an interrupt was raised due to data targeted to the selected virtual machine. This interrupt may originate in an incoming network packet which content may be dedicated for a specific virtual machine. Such triggers may be more or less a good source for the randomness of entropy elements. Additionally, hardware based entropy element generators may be used. They may, e.g., be based on white noise generating diodes.

According to a further embodiment of the method, the entropy elements having the same identifier may build an entropy element pool, in particular, within the hypervisor. This way, generated selected entropy elements may be assigned to a single virtual machine only. In particular, a usage of entropy elements being based on triggers related to a first virtual machine may not be used for a second virtual machine. However, the second virtual machine may have assigned its own entropy element pool. Thus, each of the virtual machines running on a hypervisor may have assigned their own entropy element pool.

According to an advanced embodiment of the method, the method may comprise building an entropy element pool being assigned to, and/or managed by, the hypervisor. This may be a generic entropy element pool which may not be dedicated to a specific virtual machine. Entropy elements of such a generic entropy element pool may also be used—under certain conditions—for all virtual machines. However, such entropy elements may have a relative low randomness in particular if they may be based on input/output triggers. Their randomness may be influenced by intruders, as explained above.

One embodiment of the method may comprise mixing the entropy elements of entropy element pools of different virtual machines. For example, two or more entropy elements may be mixed. It may be done selectively by keeping the original entropy element pool or by building a new larger combined entropy element pool. Such a mixing may aim at having an entropy element pool with entropy elements having a larger randomness when compared to single entropy element pools. The entropy element pools selected for a mixing may be related to virtual machines being operated by the same operator or tenant in a virtualized cloud based environment. It may be prohibited to mix entropy elements of different operators or tenants of virtual machines if both virtual machines belong to different operators. This way, an influence regarding a random number generation across virtual machine operators may be prevented.

According to one embodiment, the mixing may comprise selecting at least one entropy element from a first entropy element pool and include it in a second entropy element pool assigned to another virtual machine. The inclusion may comprise a transfer from one entropy element pool to another, as well as copying the related entropy element from one entropy element pool to another. This may further enhance the randomness of the entropy elements within different entropy element pools. A selection of entropy elements may, e.g., being based on a round robin or other functions.

Alternatively, the mixing may comprise combining the entropy elements of two different entropy element pools thereby building a joint entropy element pool. A joint entropy element pool may guarantee a higher randomness than a single pool of entropy elements. It may further be ensured that entropy element pools of the same operator, in particular the tenant operator, may be joined if more than one operator may operate different virtual machines on the same hypervisor, as it may be the case in virtualized cloud computing centers.

Also, more than two entropy element pools may be merged or combined and may—like in the case of a combination of just two entropy element pools—for further processing be treated as a normal entropy element pool related to a single virtual machine. A joint entropy element pool may be dedicated to one single virtual machine or a plurality of virtual machines. It may also be possible to merge entropy element pools that may reside on different hypervisors on the same or different host computers.

According to another embodiment of the method, an entropy element may be transferable from the hypervisor, in particular from the related entropy element pool, to the virtual machine using an interface. Such an interface may be a virtualized or para-virtualized interface. The known function "virtio-rng" may be instrumental for achieving such a transfer. However, the entropy element pools may be stored and managed using the hypervisor. Only in a case in which an entropy element may be needed within a virtual machine, an entropy element may be selected from the related entropy element pool and transferred to the virtual machine via the interface.

According to one embodiment, in case of a joint entropy element pool, entropy elements may be transferrable to a second virtual machine after a predefined number of entropy elements have been transferred to a first, e.g., the selected virtual machine. Such a mechanism may ensure that the selected virtual machine which requires a higher number of entropy elements—e.g., during the process of being installed and deployed—may be served first, before entropy elements may be transferred to another, e.g., already up and running virtual machine. This may ensure a fast and more secure installation of new virtual machines which need deployment because they may require a certain number of entropy elements or entropy element bytes for a generation of security keys or security key pairs.

According to a further embodiment of the method, the selecting of the at least one entropy element from a first entropy element pool may be performed after a predefined number of entropy elements have been transferred to the selected virtual machine which is related to the entropy element pool. This type of mixing elements from different entropy element pools may guarantee that a virtual machine may receive enough entropy elements during, e.g., an installation of the virtual machine for generating security keys. The security keys may for example be required for an initialization of an SSL-like encryption for a secure login by a user to the virtual machine. It may also cause a halt or prevent completion of the installation of the virtual machine due to missing random numbers for the generation of a security key which may be required to finish the installation.

According to another embodiment, the selecting may comprise restricting the number of entropy elements of the entropy element pool assigned to the hypervisor for the mixing with an entropy element pool assigned to a virtual machine to a predefined percentage of the number of entropy elements of the entropy element pool assigned to the virtual machine. Such a technique may ensure that not too many generic entropy elements from the pool being related to the hypervisor may be intermixed with entropy elements dedicated to a single virtual machine. An entropy element pool dedicated to a virtual machine may be diluted by elements of a generic entropy element pool. This may reduce the randomness of entropy elements of the entropy element pool which may be dedicated to a single virtual machine. The related percentage may be preset by a predefined value.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

We claim:

1. A method comprising:
deploying at least one virtual machine on a hypervisor;
generating entropy elements by the hypervisor based on triggers, including a first and second entropy element, wherein the first entropy element is associated with a first trigger and the second entropy element is associated with a second trigger;
assigning a separate identifier to each of the first and second generated entropy elements, wherein the entropy elements based on triggers for a selected virtual machine are assigned a same identifier;
restricting use of the entropy elements for the selected virtual machine to entropy elements having the same identifier;

building an entropy element pool with two or more entropy elements having the same identifier; and mixing entropy elements of two different entropy pools, including a first entropy element pool of a first virtual machine with entropy elements of a second entropy element pool of a second virtual machine, wherein the mixing comprises selecting at least one entropy element from the first entropy element pool and including the selected entropy element in the second entropy element pool.

2. The method according to claim 1, wherein the trigger is selected from the group consisting of:

a time-stamp of an input signal of the selected virtual machine, and a time-stamp of an output signal of the selected virtual machine, and an interrupt dedicated to the selected virtual machine.

3. The method according to claim 1, further comprising assigning the built entropy element pool to the hypervisor.

4. The method according to claim 1, wherein the mixing further comprises building a joint entropy element pool by combining the entropy elements of the first and second entropy element pools, wherein the first and second entropy pools reside on at least one hypervisor.

5. The method according to claim 1, wherein the including comprises transferring the selected entropy element from the first entropy element pool of the first virtual machine to the second entropy element pool of the second virtual machine.

6. The method according to claim 5, further comprising selecting an entropy element for transfer to a second virtual machine after a predefined number of entropy elements have been transferred to a first virtual machine.

7. The method according to claim 6, wherein the selecting the at least one entropy element from the first entropy element pool is performed after a predefined number of entropy elements have been transferred to the virtual machine which is related to the entropy element pool.

8. The method according to claim 5, wherein the selecting comprises restricting the number of entropy elements of the entropy element pool assigned to the hypervisor for the mixing with an entropy element pool assigned to the virtual machine to a predefined percentage of the number of entropy elements of the entropy element pool assigned to the virtual machine.

9. The method according to claim 1, wherein the mixing is selected from the group consisting of: maintaining the first entropy element pool and building a new entropy element pool.

10. The method according to claim 1, wherein the including comprises copying the selected entropy element from the first entropy element pool of the first virtual machine to the second entropy element pool of the second virtual machine.

11. An entropy element generator comprising:

a first circuit to deploy at least one virtual machine on a hypervisor;

a second circuit to generate entropy elements by the hypervisor, including a first and second entropy element, based on triggers, wherein the first entropy element is associated with a first trigger and the second entropy element is associated with a second trigger, wherein triggers are associated with selected virtual machines;

a third circuit to assign a separate identifier to each of the first and second generated entropy elements, wherein the entropy elements based on triggers for a selected virtual machine are assigned the same identifier; and a fourth circuit to restrict use of the entropy elements for the selected virtual machine to entropy elements having the same identifier;

a fifth circuit to build an entropy element pool with two or more entropy elements having the same identifier; and a sixth circuit mixing the entropy elements of two different entropy pools, including a first entropy element pool of a first virtual machine with entropy elements of a second entropy element pool of a second virtual machine, wherein the mixing includes maintaining the first entropy element pool and building a new entropy element pool.

12. The entropy element generator of claim 11, further comprising the third circuit to assign each entropy element having the same identifier to a common entropy element pool.

13. A computer program product comprising a non-transitory computer readable storage medium having computer readable program code embodied thereon, which, when executed, causes a computer to implement a method comprising:

deploying at least one virtual machine on a hypervisor;

generating entropy elements by the hypervisor, including a first entropy element and a second entropy element, wherein the first entropy element is associated with a first trigger and the second entropy element is associated with a second trigger;

assigning a separate identifier to each of the first and second entropy elements, wherein the entropy elements generated based on triggers for a selected virtual machine are assigned a same identifier; and restricting use of the entropy elements for the selected virtual machine to entropy elements having the same identifier;

building an entropy element pool with two or more entropy elements having the same identifier;

mixing entropy elements of two different entropy pools, including entropy elements of a first entropy element pool of a first virtual machine with entropy elements of a second entropy element pool of a second virtual machine wherein mixing comprises building a joint entropy element pool by combining the entropy elements of the first and second entropy element pools, wherein the first and second entropy pools reside on an element that includes one hypervisor and two different hypervisors.

14. The computer program product of claim 13, further comprising transferring an entropy element from the entropy element pool to a virtual machine using an interlace.

* * * * *